United States Patent
Killick

[15] 3,639,074
[45] Feb. 1, 1972

[54] TURBINES

[72] Inventor: Herbert Percy Killick, Poulton-le-Fylde, England

[73] Assignee: C.M.W. Laboratories Limited, Blackpool, England

[22] Filed: May 18, 1970

[21] Appl. No.: 38,048

[30] Foreign Application Priority Data

May 23, 1969 Great Britain ..................... 26,510/69

[52] U.S. Cl. ..................... 415/110, 415/503, 308/DIG. 1, 32/27
[51] Int. Cl. ..................... F03b 13/04, A61c 1/10, F16c 7/04
[58] Field of Search ................. 415/503, 110, 111, 112, 113, 415/114; 308/9, DIG. 1; 32/27

[56] References Cited

UNITED STATES PATENTS

| 3,101,541 | 8/1963 | Hoffmeister | 32/27 |
| 2,945,299 | 7/1960 | Fritz | 32/27 |
| 3,055,112 | 9/1962 | Borden | 415/503 |
| 3,063,039 | 11/1962 | Taft | 308/9 |
| 3,128,988 | 4/1964 | Mandroian | 415/503 |
| 3,210,848 | 10/1965 | Bizzigotti | 415/503 UX |
| 3,471,125 | 10/1967 | Taubald et al. | 415/112 |

Primary Examiner—Carlton R. Croyle
Assistant Examiner—Richard E. Gluck
Attorney—Ostrolenk, Faber, Gerb & Soffen

[57] ABSTRACT

This invention provides a small high speed gas driven turbine of the gas-bearing type having a vent in the top plate of the casing surrounding the bearing to vent the upper bearing of the turbine, wherein the upper bearing chamber is additionally vented by one or more auxiliary vents in the casing and extending generally at right angles to the longitudinal axis of the rotor, the auxiliary vents suitably being spaced equidistantly around the circumference of the casing and from 0.005 to 0.05 inches in diameter. The invention also provides a dental handpiece having such a turbine.

3 Claims, 1 Drawing Figure

PATENTED FEB 1 1972
3,639,074
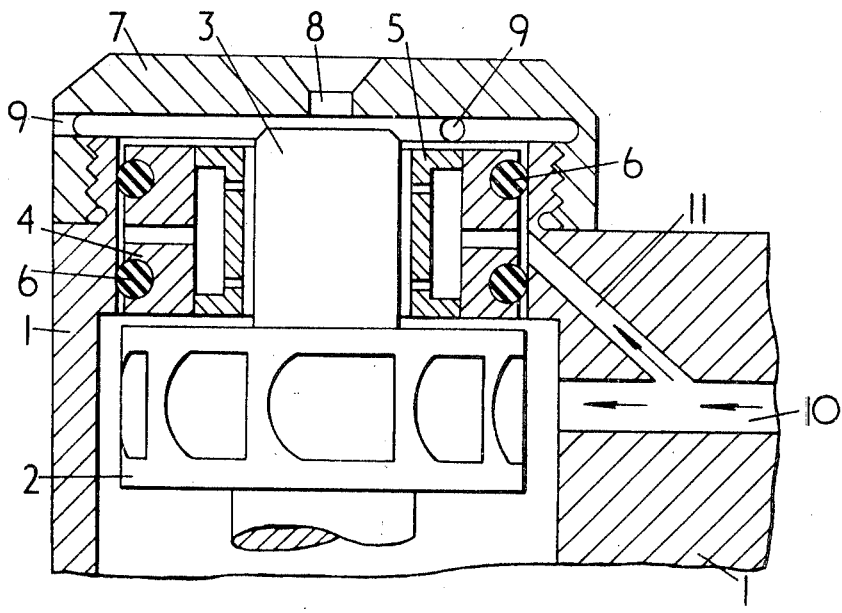
INVENTOR
BY *Herbert Percy Killick*
Ostrolenk, Faber, Gerb & Soffen
ATTORNEYS

TURBINES

This invention is concerned with improvements in and relating to small high speed gas driven turbines, as used for example in dentistry for driving the conventional dental burs.

More particularly, the invention relates to such turbines of the gas-bearing type, that is turbines wherein the turbine rotor is supported, in its bearings, on a film of gas and particularly on gas derived from the same source as is used for driving the turbine itself. This gas is fed under pressure not only to the blades of the turbine rotor but also through feed holes in outer bearing elements within which the rotor rotates with a very small clearance, the rotor being separated from the bearing element by a very thin film of gas.

It is important that the gas from the bearings be vented to the atmosphere since otherwise the film of gas forming the bearing breaks down. In the case of turbines used in dental hand pieces the lower bearing (that is the bearing adjacent the dental bur) vents through the aperture in which the bur-receiving end of the turbine spindle rotates. However, in the case of the upper bearing (that is the bearing furtherest away from the dental bur) it is generally necessary to provide special vent means and this is commonly achieved by providing a vent in the top plate of the casing surrounding the bearing, this vent generally being a "central" vent that is the vent is in that part of the top casing through which the axis of the rotor passes.

The present invention broadly consists in a gas-bearing turbine of the type described wherein the upper bearing chamber is additionally vented by one or more auxiliary vents in the casing and extending generally at right angles to the longitudinal axis of the rotor.

Suitably, there will be two or more auxiliary vents spaced equidistantly around the circumference of the casing and these vents may, for example, be from 0.005 to 0.05 inches in diameter.

The turbine of the present invention has the particular advantage that, if the central or top vent is blocked for any reason the auxiliary vents continue to vent the upper bearing and hence smooth operation of the turbine is not interrupted. This is particularly important in the case of dental hand pieces fitted with air-bearing turbines wherein a top vent may accidentally be covered by the operator's finger or, when used in the mouth, may be occluded by the soft tissue of the mouth.

In order that the invention may be well understood reference will now be made to the accompanying diagrammatic drawing which is a partial longitudinal section through a turbine in accordance with the invention. This turbine has a general construction similar to that described in British Pat. No. 1,018,300.

Referring now to the drawing, a turbine comprises a housing 1 having mounted therein a turbine 2 mounted upon rotor 3. The upper air bearing for rotor 3 is formed by outer sleeve 4 and inner sleeve 5, outer sleeve 4 being mounted within housing 1 by means of resilient O-rings 6. The upper part of the casing of the turbine is formed by cap member 7 which engages in screw thread relationship with housing 1 and is provided with a central vent 8. There are also provided in cap member 7 and housing 1 three equidistantly spaced auxiliary vents 9.

Main housing 1 is provided with main air passageway 10 to supply gas to drive turbine 2; main air passage 10 having branching therefrom auxiliary passage 11 which supplies air to the bearing formed between rotor 3 and inner sleeve 5.

In operation, air is supplied through main air passageway 10 and drives turbine 2 and at the same time air supplied via auxiliary passage 11 passes to the air bearing between rotor 3 and inner sleeve 5 whence it is exhausted via central vent 8. If for any reason, central vent 8 is occluded air from the bearing may then be vented by auxiliary vents 9 and thus the bearing air film will not be destroyed and the turbine will continue to act satisfactorily.

I claim:
1. A small, high speed, gas driven turbine, comprising:
    a turbine rotor having an axis about which said rotor rotates;
    a rotor casing, including a generally cylindrical opening within which said rotor is located; a rotor sleeve in said casing; said rotor passing through said sleeve so as to rotate with respect thereto;
    a bearing chamber between said rotor and said sleeve for being filled with air and for serving as an air bearing for said rotor; an air supply conduit communicating with said bearing chamber for supplying air thereto;
    an end cap having a main portion, which said main portion extends over an end of said cylindrical opening for closing off said opening; a main vent through said end cap main portion, which said main vent communicates with said bearing chamber;
    at least one auxiliary vent through said casing which said auxiliary vent communicates with said bearing chamber and is oriented so as to be substantially in a plane passing through and perpendicular to said rotor axis, whereby a blockage of said main vent will not interfere with said auxiliary vent.
2. A turbine as claimed in claim 1, having a plurality of said auxiliary vents, each being substantially in a respective said plane perpendicular to said rotor and all being equidistantly spaced apart around said casing.
3. A turbine as claimed in claim 1, in which the auxiliary vents are from 0.005 to 0.05 inches in diameter.

* * * * *